(12) United States Patent
Ranganathan et al.

(10) Patent No.: US 8,410,733 B2
(45) Date of Patent: Apr. 2, 2013

(54) WOUND FIELD SYNCHRONOUS MOTOR DRIVE

(75) Inventors: Vilanguppam Thathachary Ranganathan, Karnataka (IN); Amit Kumar Jain, Karnataka (IN)

(73) Assignee: Indian Institute of Science, Karnataka (IN)

( * ) Notice: Subject to any disclaimer, the term of this patent is extended or adjusted under 35 U.S.C. 154(b) by 522 days.

(21) Appl. No.: 12/636,418

(22) Filed: Dec. 11, 2009

(65) Prior Publication Data

US 2010/0253254 A1 Oct. 7, 2010

(30) Foreign Application Priority Data

Apr. 2, 2009 (IN) .............................. 765/CHE/2009

(51) Int. Cl.
*H02P 6/00* (2006.01)
(52) U.S. Cl. ................................... 318/400.01; 318/799
(58) Field of Classification Search .................. 318/700, 318/400.01, 798, 799, 801, 803
See application file for complete search history.

(56) References Cited

U.S. PATENT DOCUMENTS

| | | | |
|---|---|---|---|
| 3,757,197 A | | 9/1973 | Bailey |
| 4,449,087 A | * | 5/1984 | Lippitt et al. ................. 318/723 |
| 4,625,160 A | * | 11/1986 | Hucker ............................ 322/32 |
| 5,029,263 A | * | 7/1991 | Rozman ........................ 318/714 |
| 5,493,200 A | * | 2/1996 | Rozman et al. ................ 322/10 |
| 7,184,927 B2 | * | 2/2007 | Anghel et al. ............ 318/400.04 |
| 7,227,271 B2 | * | 6/2007 | Anghel et al. .................. 290/31 |

OTHER PUBLICATIONS

Bendre, A., et al., "A Current Source PWM Inverter with Actively Commutated SCRs," IEEE Transactions on Power Electronics, Jul. 2002, vol. 17, Issue 4, pp. 1571-1576.
Le-Huy, H., et al., "A Self-Controlled Synchronous Motor Drive using Terminal Voltage System," IEEE Transactions on Industry Applications, Jan./Feb. 1982, vol. IA-18, No. 1, pp. 46-53.
Nakano, T., et al., "A High Performance Cycloconverter-Fed Synchronous Machine Drive System," IEEE Transactions on Industry Applications, Sep./Oct. 1984, vol. IA, No. 5, pp. 1278-1284.
Singh, B., et al., "Real Time DSP Based Implementation of a New Control Method of Active Power Filter," IEEE Canadian Conference on Electrical and Computer Engineering, May 24-28, 1998, vol. 2 pp. 794-797.
Le-Huy, H., et al., "Microprocessor Control of a Current-Fed Synchronous Motor Drive", IEEE Transaction on Industry Applications Annual Meeting Conference Records, p. 873-80, Oct. 1979.

* cited by examiner

*Primary Examiner* — Rina Duda
(74) *Attorney, Agent, or Firm* — Steven S. Rubin, Esq.; Moritt Hock & Hamroff LLP

(57) ABSTRACT

A hybrid synchronous motor drive circuit and method operates in one or two or more modes based on the speed of the synchronous machine. In a first mode, the synchronous machine is driven at a relatively low frequency by a current controlled voltage source inverter (VSI). In a second mode, the synchronous machine is driven at a relatively high frequency by a load commutated inverter (LCI) in tandem with the VSI. In the second mode, the LCI acts as the main power source for controlling the machine and determining machine torque and speed. The VSI acts as a harmonic compensator by compensating the dominant harmonic currents fed to the machine from the LCI such that the synchronous machine will see sinusoidal currents and thereby sinusoidal voltages at its terminals. The VSI also functions to provide sufficient reactive power at fundamental frequency so that the thyristors in the inverter are load commutated.

12 Claims, 4 Drawing Sheets

WOUND FIELD SYNCHRONOUS MOTOR DRIVE

CROSS REFERENCE TO RELATED APPLICATIONS

This application claims priority to Indian Patent Application Ser. No. 765/CHE/2009 filed Apr. 2, 2009, the contents of which are incorporated by reference herein in its entirety.

TECHNICAL FIELD

This application relates generally to drive circuits and methods for driving a synchronous motor drive. More particularly, the application relates to a hybrid driving method in which a synchronous motor is driven by two or more drive circuits or methods.

BACKGROUND

The development of semiconductor variable frequency sources, such as inverters and cyclo-converters, has allowed the use of synchronous motors in a wide variety of applications. The high efficiency of synchronous motors makes them more appealing than induction motors. Commonly used synchronous motors include wound field synchronous motors (WFSM), permanent magnet synchronous motors (PMSM), synchronous reluctance synchronous motors (SRSM), and hysteresis motors.

Drive systems are used to operate these motors. The drive system is responsible for operating the motor in the forward and reverse direction, and for the acceleration and braking of the motor as well.

Synchronous machine drive systems generally comprise a synchronous machine and an inverter that is configured from a plurality of pairs of solid state switching devices, typically silicon controlled rectifiers (thyristors). Rendering the thyristors conductive in a predetermined control sequence causes the synchronous machine to be supplied with alternating current and hence to commence the appropriate rotation.

Conventionally, WFSM has become the widely used drive for high-power applications in the range of a few MW's to 100s of MW's. There are most commonly two drive configurations for driving a WFSM at high-power, including the cyclo-converter and the load commutated inverter (LCI), each configuration generally being used for different applications. The application areas for these two drive methods are typically divided based on the operating speed range of the WFSM.

In low speed applications, such as rolling mills, ball mills, mine hoists and ship propulsion, naturally commutated cyclo-converter driven WFSM drives are widely used. In this speed range, the cyclo-converter driven WFSM provides a high performance drive solution with the ability to operate in all four quadrants of the plane whose axes are torque and speed (four-quadrant operation), indicating an ability to forward and reverse brake, and forward and reverse motor.

In normal to high speed applications, such as fans, compressors, and pumped storage plants, load commutated inverter (LCI)-fed WFSM drives are the most widely used solution. The LCI drive method is preferred in high speed applications due to the ability to decouple the operation of the rectifier and inverter. Additionally, the LCI typically has two bridges, compared to a cyclo-converter that requires six bridges for the typical six-pulse configuration.

SUMMARY

An illustrative embodiment provides a drive circuit for a synchronous motor having a first circuit for outputting a first drive signal for a synchronous motor in a first mode and a second circuit for outputting a second drive signal for a synchronous motor in a second mode. In one example, the second circuit does not output a second drive signal in the first mode and in the second mode both the first and second circuits are operational. The first circuit is configured to modify the first drive signal output by the second circuit, thereby producing a third drive signal for driving the synchronous motor.

According to another aspect of the embodiments, the first circuit is configured to output a drive signal for the synchronous motor when it is operated in the first mode at a first speed, and the first and second circuits are configured to provide a drive signal to the synchronous motor when the synchronous motor is operated in the second mode at a second speed. In this embodiment, the second speed is greater than the first speed.

According to another aspect of the embodiments, the first circuit has a voltage source inverter including at least a rectifier and inverter and the second circuit is a load commutated inverter (LCI).

According to another aspect of the embodiments, the third drive signal includes but is not limited to a substantially smooth sinusoidal voltage waveform and a substantially smooth current waveform, substantially free of secondary harmonics.

According to yet another aspect of the embodiments, the first mode is utilized to drive a synchronous motor up to a threshold speed of less than 10% of a rated speed of the synchronous motor, and above the threshold speed, the second mode is utilized to drive the synchronous motor.

Another illustrative embodiment provides a method of driving a synchronous motor, the method includes but is not limited to a first mode driving the synchronous motor with an output of a current controlled voltage source inverter (VSI); and a second mode, producing a first drive signal output from a load commutated inverter (LCI), and producing a compensating second drive signal from a VSI circuit to substantially eliminate secondary harmonics existing in the first drive signal, thereby producing a third drive signal for driving the synchronous motor.

According to another aspect of the embodiments, the VSI is configured to output a drive signal to the synchronous motor when it is operated in the first mode at a first speed, and the VSI and LCI circuits are configured to provide a drive signal to the synchronous motor when the synchronous motor is operated in the second mode at a second speed, the second speed being greater than the first speed.

According to another aspect of the embodiments, the first mode is utilized to drive the synchronous motor up to a threshold speed of less than 10% of a rated speed of the synchronous motor, and above the threshold speed, the second mode is utilized to drive the synchronous motor.

According to another illustrative embodiment, a motor includes but is not limited to a synchronous motor, a drive circuit comprising, a first circuit and a second circuit, the first circuit outputting a first drive signal to the synchronous motor in a first mode and the second circuit, separate from the first circuit, outputting a second drive signal to the synchronous motor in a second mode. The second circuit does not output a drive signal when the synchronous motor is in the first mode, and in the second mode, both the first and second circuits are operational, and the first circuit is configured to modify the first drive signal output by the second circuit, thereby producing a third drive signal for driving the synchronous motor.

According to yet another aspect of the embodiments, an output of the second circuit is connected to an input terminal of the synchronous motor, and an output of the first circuit is connected to the input terminal through one or more inductors.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
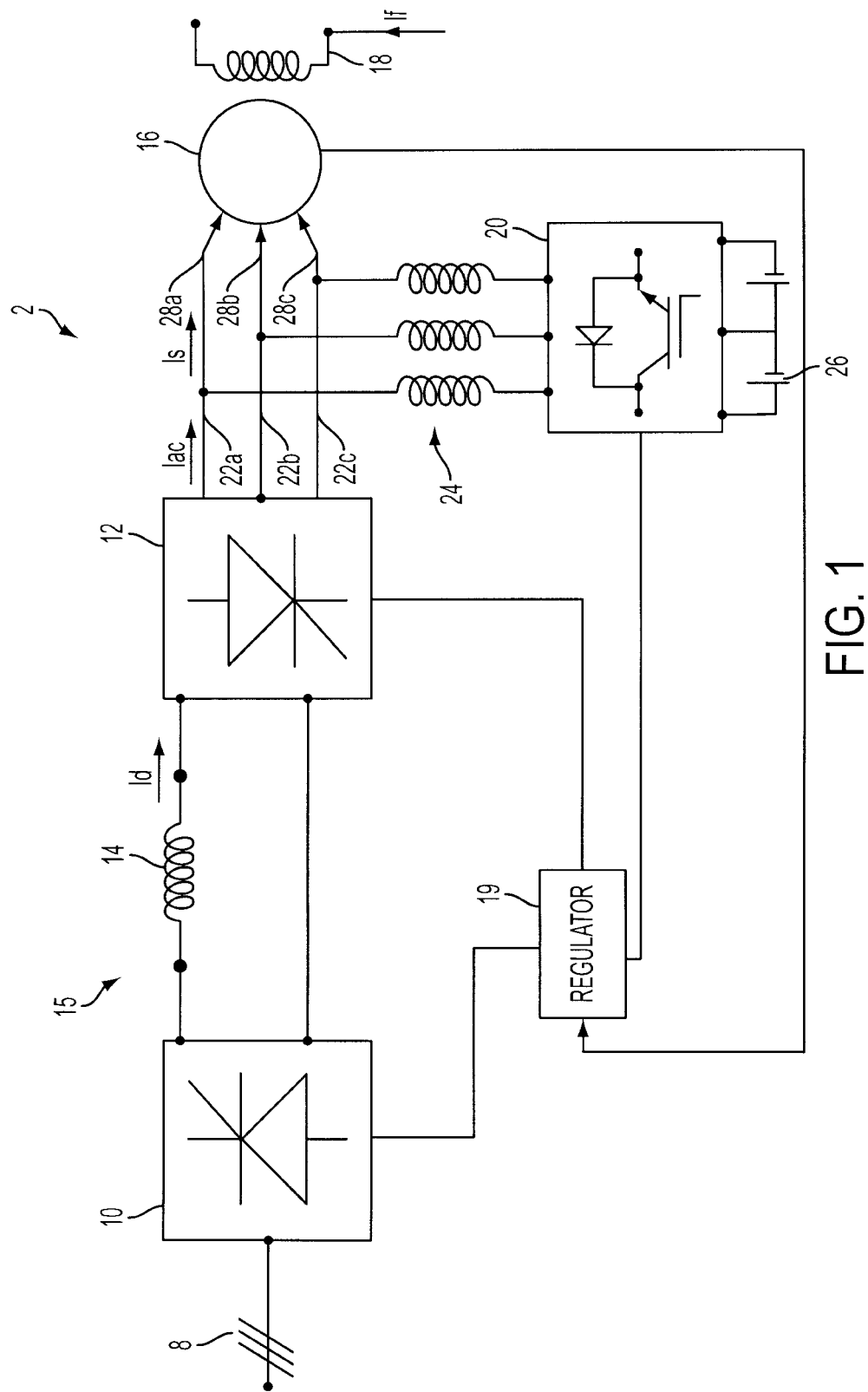
FIG. 1 is an illustrative circuit schematic of a hybrid synchronous motor drive.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

a. Structure of the LCI/VSI Fed Hybrid WFSM Drive Circuit

FIG. 1 sets forth an example block diagram of a synchronous motor drive circuit 2. As set forth in FIG. 1, the drive circuit includes an alternating current source 8, a thyristor type rectifier device 10, a direct current (DC) link 14, a thyristor type inverter device 12, a voltage source inverter (VSI) device 20, a synchronous machine 16, dc current injected rotor windings 18, and a regulator 19. The thyristor type rectifier device 10, direct current (DC) link 14, and thyristor type inverter device 12 together constitute a load-commutated inverter (LCI) 15.

The alternating current source 8 could be any alternating power source, including, for example, three phase AC power. The DC link 14 connects the rectifier 10 to the inverter 12. An inductor placed inline between the rectifier 10 and the inverter 12 operates to smooth the DC link current output from the rectifier 10. The inverter 16 includes three separately phased outputs 22a, 22b, 22c for driving the synchronous machine 16. The use of three-phases is exemplary only, and more or less could be used without departing from the spirit or scope of the invention. The VSI 20 is connected to the synchronous machine 16 through inductors 24 and is driven by a power source 26. DC current injection link 18 provides DC excitation to the rotor windings of the synchronous machine 16.

The synchronous machine 16 is, for example, a synchronous motor with a rotor having magnetic poles and a stator having stator windings, driven by three phased input terminals 28a, 28b, and 28c and current injection link 18.

Figure 2:
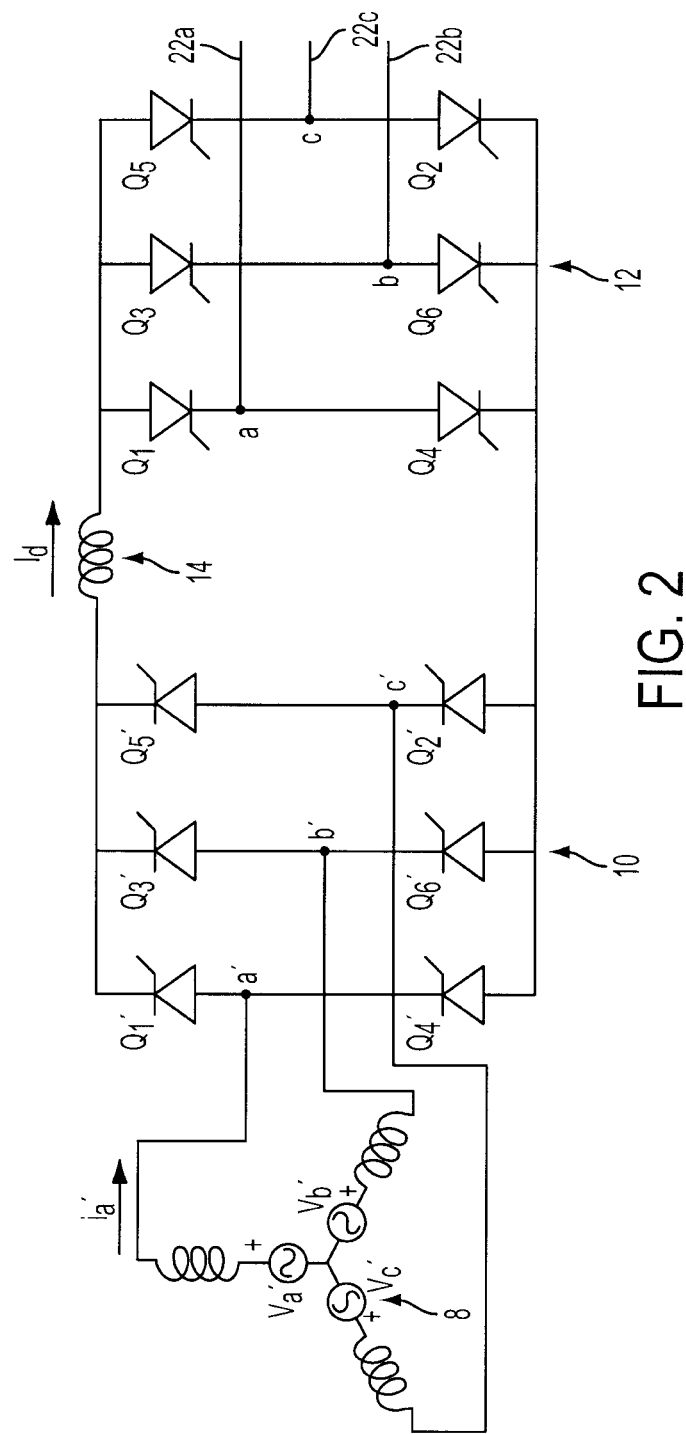
FIG. 2 is an example expanded circuit schematic of the inverter and rectifier elements of FIG. 1.

FIG. 2 shows an expanded circuit diagram of the LCI 15 of FIG. 1. This example of the LCI 15 shows the rectifier 10, DC link 14, and inverter 12. Similar reference numbers are utilized for similar circuit elements relative to FIG. 1. As set forth in FIG. 2, the rectifier 10 is comprised of thyristors Q1'-Q6'. Thyristors Q1' and Q4' are placed in series and connected to a phase a' output of the AC supply 8. Thyristors Q3' and Q6' are placed in series and connected to a phase b' output of the AC supply 8. Thyristors Q5' and Q2' are placed in series and connected to a phase c' output of the AC supply 8. A regulator 19 of FIG. 1 controls the firing angle of the thyristors Q1'-Q6' in a pattern well known in the art to provide DC current on the DC link 14 for feeding the inverter 12.

As further set forth in FIG. 2, the inverter 12 is comprised of thyristors Q1-Q6. The thyristors Q1-Q6 conduct in response to firing signals from a regulator 19 FIG. 1. The thyristors are sequentially rendered conductive with each thyristor remaining conductive for a period of time by regulator 19 of FIG. 1. Each of the thyristors Q1-Q6 is respectively commutated, that is, current conduction through each thyristor is extinguished, at a predetermined instant following initiation of thyristor conduction by back EMF from the synchronous machine 16. Rendering thyristors Q1-Q6 conductive and non-conductive in the manner described above supplies synchronous machine 16 with alternating stator currents via input terminals 28a, 28b, and 28c, via inverter 12 output terminals 22a-22c, thereby causing the synchronous machine 16 to commence rotation.

Figure 3:
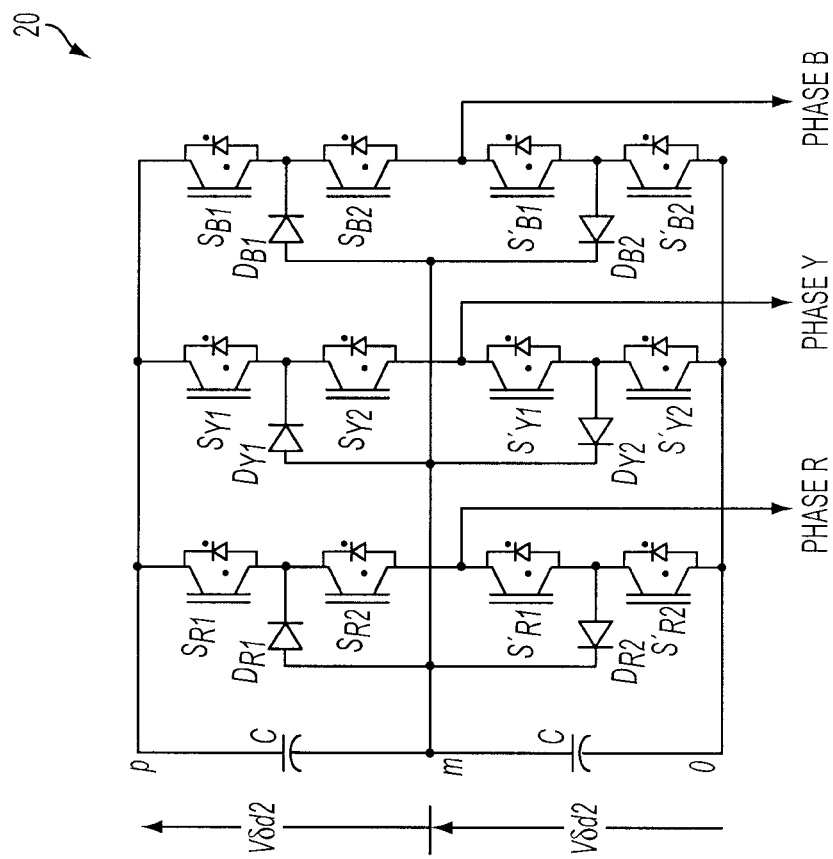
FIG. 3 is an example expanded circuit schematic of the voltage source inverter of FIG. 1.

FIG. 3 sets forth an expanded circuit diagram of the VSI device 20. The VSI 20 allows a variable frequency supply to be obtained from a DC supply 26 of FIG. 1. The VSI 20, for example, can be operated as a pulse-width modulated (PWM) inverter. When operated as a stepped wave inverter, switches S are switched in sequence with a phase difference between them and each switch S is kept on for period of time. Frequency is varied by varying the duration between the turn-on of switches S. The output voltage can be varied by varying DC input voltage or by modulation of pulse widths (PWM). As shown in FIG. 3, the VSI 20 produces three separately phased outputs Phase R, Phase Y, and Phase B, which are correspondingly attached to the input terminals 28a, 28b, and 28c of the synchronous machine 16 through inductors 24 (FIG. 1).

The regulator 19 of FIG. 1 controls the firing of the thyristors Q1'-Q6' of the rectifier 10 of FIG. 2, the firing of the thyristors Q1-Q6 of the inverter 12 of FIG. 2, and the switching of the switches S of the VSI circuit 20 of FIG. 3. Although the regulator 19 is shown as a single block in FIG. 1, it need not be organized as such. For example, the control of the thyristors Q1'-Q6' may be controlled via a control circuit portion integrated in the rectifier 10 itself, the thyristors Q1-Q6 may be controlled via a control circuit portion integrated in the inverter 12 itself, and the switches S of the VSI circuit 20 may be controlled via a control circuit portion integrated in the VSI circuit 20 itself. Other variations are also possible without departing from the spirit of the invention.

b. Operation of the LCI/VSI Fed Hybrid WFSM Drive Circuit

As set forth above, the load commutated inverter (LCI) drive circuit is a high efficiency synchronous drive circuit at normal to high speeds. However, the LCI drive has particular drawbacks relating to low speed operation and inefficiencies due to generation of non-sinusoidal current waveforms that can be addressed as set forth in the disclosed embodiments.

Figure 4:
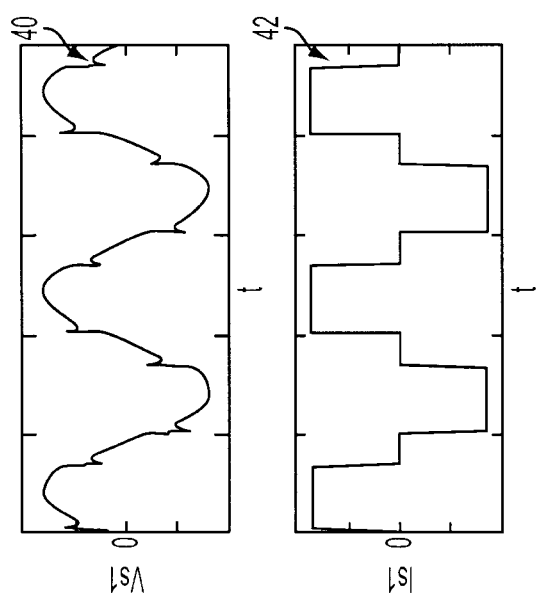
FIG. 4 shows example voltage and current waveforms between the drive circuit and the synchronous motor.

FIG. 4 sets forth timing diagrams of an example current waveform Is1 and a voltage waveform Vs1 in accordance with LCI-fed would-field synchronous machine drives. The waveforms of FIG. 4 were produced using the circuit diagram of FIG. 1, with the VSI 20 and inductors 24 removed. As shown in waveform Vs1 of FIG. 4, the voltage waveform Vs1 applied to the synchronous motor may contain ripples 40 caused by the square-wave current waveform Is1 42 that may negatively impact the function of the synchronous machine 16. For example, the ripples 40 in the applied voltage waveform Vs1, caused by the discontinuous nature of the current waveform Is1, may lead to copper losses in the windings and iron losses in the core of the synchronous machine 16, leading to additional undesired heating and reduced transferred power.

By providing the VSI structure 20 as set forth in FIG. 1, machine operation may be enhanced. For instance, the synchronous machine can be operated at low speeds by the VSI 20, thereby avoiding any low-speed and engine start-up deficiencies of the LCI drive method alone. In addition, the synchronous machine can also be efficiently operated at high speeds by causing the LCI 15 and VSI 20 circuits to operate in tandem.

In the first mode, the VSI circuit 20 may be used to drive the synchronous machine with substantially smooth sinusoidal currents. A sinusoidal current waveform is "smooth" when the fundamental sinusoidal component exists with substantially no additional secondary harmonics that add ripples or noise to the fundamental sinusoidal signal. At the same time, the regulator 19 controls the firing of the thyristors contained within the rectifier 10 so that its output voltage is very low, zero, or slightly negative, thus preventing the inverter 12 from driving the synchronous machine 16. The regulator 19 drives the VSI 20 to output drive waveforms to the synchronous machine 16 to cause the motor to start-up, or to run at slow speeds. The VSI is operated in a pulse-width modulation (PWM) mode such that the output voltage is controlled through pulse width modulation corresponding to the switching frequencies of the switches S. The input voltage Vdc can be realized in various ways, for instance by means of a simple uncontrolled diode rectifier connected to a three phase AC mains. Optionally, VSI output voltage can be further controlled by providing separate means to vary the DC input voltage to the VSI.

Generally, the VSI 20 will continue to operate the synchronous machine 16 alone until the speed of the machine 16 reaches a specified threshold level or limit, for instance approximately 10% of its rated speed (for example, a motor frequency of 5 Hz). Of course, the threshold level may vary and be set according to the particular application and design considerations. Because the LCI 15 is not required to operate the synchronous machine 16 at low speed or to start the synchronous machine from a stop, the need for complex DC link current pulsing techniques can be eliminated, and high performance operation is provided even at slow speeds.

At or above the threshold point, the regulator 19 begins causing the thyristors of the rectifier 10 to fire, which in turn causes the inverter 12 to begin outputting square-wave current waveforms Is1 and corresponding pseudo-sinusoidal voltage waveforms Vs1 with ripples 40 of FIG. 4. At the same time, however, the regulator 19 causes the VSI 20 to begin outputting compensating currents in such a manner that they absorb most or all the discontinuities of the square-wave current waveforms Is1 (FIG. 4), thereby absorbing most or all of the ripple components 40 in the voltage waveforms Vs1 (FIG. 4). The VSI 20 also functions to provide sufficient reactive power at fundamental frequency so that the thyristors in the inverter 12 are load commutated. In other words, each thyristor in the inverter 12 is turned off simply by firing the next thyristor in numerical sequence (i.e., Q1, Q2, Q3, Q4, Q5, and Q6 in FIG. 12). The regulator will take into account the motor current and voltage determined at the terminals 28a, 28b, and 28c of the synchronous machine, the synchronous machine field current, the CSI current, and the VSI current in order to determine the compensating current necessary to remove the harmonics and discontinuities while enabling load commutation of the inverter 12.

Figure 5:
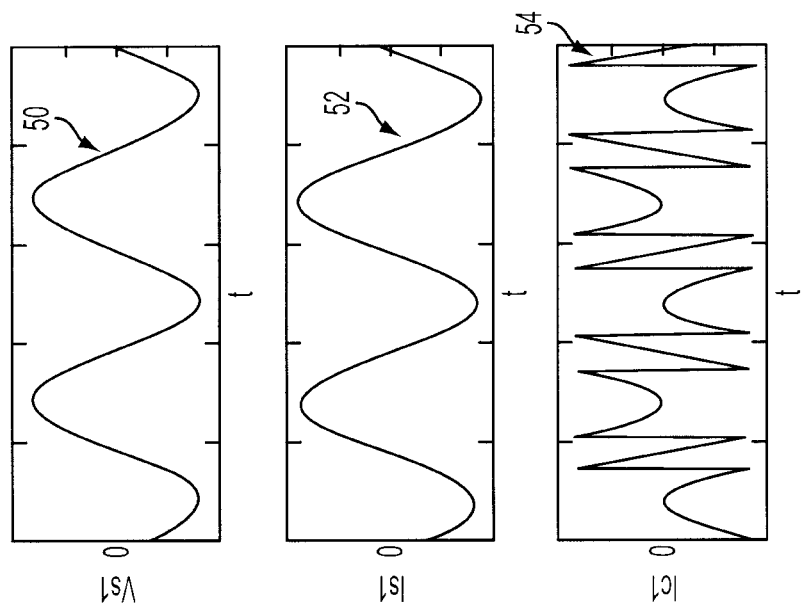
FIG. 5 shows example voltage and current waveforms between the drive circuit and the synchronous motor according to the circuit set forth in FIG. 1.

FIG. 5 sets forth exemplary waveforms 50, 52, 54 showing the simultaneous operation of the LCI 15 and the VSI 20. As shown in FIG. 5, the VSI 20 outputs current waveforms Ic2 so as to absorb most or all of the discontinuous components in the LCI current waveform Is 1 set forth in FIG. 4. As seen in waveform 54, discontinuities are apparent in the waveform Is1. Consequently, the resultant current waveforms 52, 54 show the waveform Is2 52 and corresponding voltage waveform Vs2 50 fed to the synchronous machine 16 at terminals 28a, 28b, and 28c are substantially smooth sinusoidal waveforms, providing for high performance motor control at high speeds. The current controlled VSI 20 will thus act as an auxiliary reactive power source and harmonic compensator for the LCI 15 by acting as a shunt active filter, and allowing smooth torque control of the synchronous machine.

Because the VSI 20 acts as a harmonic compensator in the second mode, it need not determine the torque or speed of the synchronous machine 16. Rather, the DC link 14 current magnitude of the LCI 15 determines the torque applied to the synchronous motor. Additionally, the speed of the synchronous machine 16 is controlled by changing the frequency of the rectangular currents output from the inverter 12.

In light of the forgoing, a drive circuit is provided that is capable of high power, high performance operation at both low and high speeds. Additionally, an LCI/VSI hybrid drive circuit is disclosed that provides the synchronous machine 16 with smooth sinusoidal voltages and currents at high speeds. Advantageously, the proposed changes can be easily retrofitted into existing LCI-fed drives without substantial additional investment, allowing for in-place upgrades of existing equipment at a lower cost compared to replacement of the entire motor system.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible sub ranges and combinations of sub ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A drive circuit for a synchronous motor comprising:
   a first circuit configured to provide a first drive signal to a stator of the synchronous motor while operating in a first mode and while operating in a second mode; and
   a second circuit configured to provide a second drive signal to the stator of the synchronous motor while operating in the second mode, wherein the first circuit is configured to adjust the first drive signal based on the second drive signal while operating in the second mode.

2. The drive circuit of claim 1, wherein:
   in the first mode, the first circuit is configured to provide the first drive signal to the stator prior to a speed of the synchronous motor exceeding a threshold limit; and
   in the second mode, the first circuit is configured to provide the first drive signal to the stator and the second circuit is configured to provide the second drive circuit to the stator when the speed of the synchronous motor exceeds the threshold limit.

3. The drive circuit of claim 1, wherein
   the first circuit is a voltage source inverter; and
   the second circuit is a load-commutated inverter including at least a rectifier and inverter.

4. The drive circuit of claim 1, wherein
   in the second mode, the first circuit is configured to modify the first drive signal such that a summation of the first drive signal and the second drive received at the stator has a sinusoidal waveform that is substantially free of secondary harmonics.

5. The drive circuit of claim 1, wherein the second circuit is connected to an input terminal of the stator, and wherein the first circuit is connected to the input terminal of the stator through one or more inductors.

6. The drive circuit of claim 2, wherein the threshold limit is about 10% of a rated speed of the synchronous motor.

7. The drive circuit of claim 3, wherein the load-commutated inverter is supplied with a three-phase alternating current.

8. A method of driving a synchronous motor, the method comprising:
   driving the synchronous motor with a first drive signal prior to a speed of the synchronous motor exceeding a threshold limit, wherein the first drive signal includes a first output from a current-controlled voltage source inverter; and
   driving the synchronous motor with a second drive signal upon the speed of the synchronous motor exceeding the threshold limit, wherein the second drive signal includes the first output and a second output from a load commutated inverter, and wherein the current-controlled voltage source inverter is configured to modify the first output based on the second output.

9. The method as set forth in claim 8, wherein the load-commutated inverter is supplied with a three-phase alternating current.

10. The method as set forth in claim 8, wherein the load-commutated inverter circuit is connected to an input terminal of a stator of the synchronous motor, and an output of the current-controlled voltage source inverter is connected to the input terminal of the stator through one or more inductors.

11. The method as set forth in claim 8, wherein the threshold limit is about 10% of a rated speed of the synchronous motor.

12. The method as set forth in claim 8, wherein the first drive circuit is configured to modify the first drive signal such that a summation of the first drive signal and the second drive received by the stator has a sinusoidal waveform that is substantially free of secondary harmonics.

\* \* \* \* \*

UNITED STATES PATENT AND TRADEMARK OFFICE
CERTIFICATE OF CORRECTION

PATENT NO. : 8,410,733 B2
APPLICATION NO. : 12/636418
DATED : April 2, 2013
INVENTOR(S) : Ranganathan et al.

It is certified that error appears in the above-identified patent and that said Letters Patent is hereby corrected as shown below:

In the Specification:

In Column 3, Line 58, delete "inverter 16" and insert -- inverter 12 --, therefor.

In Column 6, Line 12, delete "Is 1" and insert -- Is1 --, therefor.

In the Claims:

In Column 8, Line 27, in Claim 3, delete "wherein" and insert -- wherein: --, therefor.

Signed and Sealed this
Ninth Day of July, 2013

Teresa Stanek Rea
*Acting Director of the United States Patent and Trademark Office*